(12) United States Patent
Deckers et al.

(10) Patent No.: US 7,031,151 B2
(45) Date of Patent: Apr. 18, 2006

(54) MOUNTING A COMPUTER PERIPHERAL DEVICE USING A MOUNTING RAIL

(75) Inventors: Stephen V. Deckers, Eagle, ID (US); Carl R. Hoerger, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/153,709

(22) Filed: Jun. 14, 2005

(65) Prior Publication Data

US 2005/0231906 A1    Oct. 20, 2005

Related U.S. Application Data

(62) Division of application No. 10/608,727, filed on Jun. 27, 2003, now Pat. No. 6,914,778.

(51) Int. Cl.
*G06F 1/16* (2006.01)

(52) U.S. Cl. .............. 361/685; 312/223.1; 248/220.22; 248/694

(58) Field of Classification Search ................ 361/685, 361/683, 679, 686, 724–727, 753–759; 312/223.1, 312/223.2, 333; 248/201, 220.21, 220.22, 248/694
See application file for complete search history.

(56) References Cited

U.S. PATENT DOCUMENTS

| 5,680,293 | A | | 10/1997 | McAnally et al. |
| 5,682,291 | A | | 10/1997 | Jeffries et al. |
| 5,761,033 | A | * | 6/1998 | Wilhelm ..................... 361/686 |
| 5,791,498 | A | | 8/1998 | Mills |
| 5,828,547 | A | | 10/1998 | Francovich et al. |
| 6,094,342 | A | | 7/2000 | Dague et al. |
| 6,233,140 | B1 | * | 5/2001 | Cummings et al. ......... 361/683 |
| 6,275,382 | B1 | | 8/2001 | Siedow et al. |
| 6,288,902 | B1 | * | 9/2001 | Kim et al. ................ 312/223.1 |
| 6,313,985 | B1 | | 11/2001 | Chen et al. |
| 6,317,334 | B1 | * | 11/2001 | Abruzzini et al. .......... 361/685 |
| 6,388,873 | B1 | * | 5/2002 | Brooks et al. .............. 361/685 |
| 6,392,879 | B1 | | 5/2002 | Chien |
| 6,456,501 | B1 | | 9/2002 | Rubenstein et al. |
| 6,481,809 | B1 | | 11/2002 | Richardson |
| 6,496,363 | B1 | | 12/2002 | Li |
| 6,590,775 | B1 | | 7/2003 | Chen |
| 6,711,011 | B1 | | 3/2004 | Lee |
| 6,744,625 | B1 | | 6/2004 | Syring et al. |
| 6,757,164 | B1 | | 6/2004 | Lin |

* cited by examiner

*Primary Examiner*—Lisa Lea-Edmonds

(57) ABSTRACT

A mounting apparatus for enabling the mounting of a computer peripheral device to a peripheral device bay of a computer system comprises a mounting rail adapted to slideably engage a profile in the peripheral device bay. The mounting apparatus further includes an adhesive element adapted to attach the mounting rail to a side surface of the computer peripheral device.

13 Claims, 7 Drawing Sheets

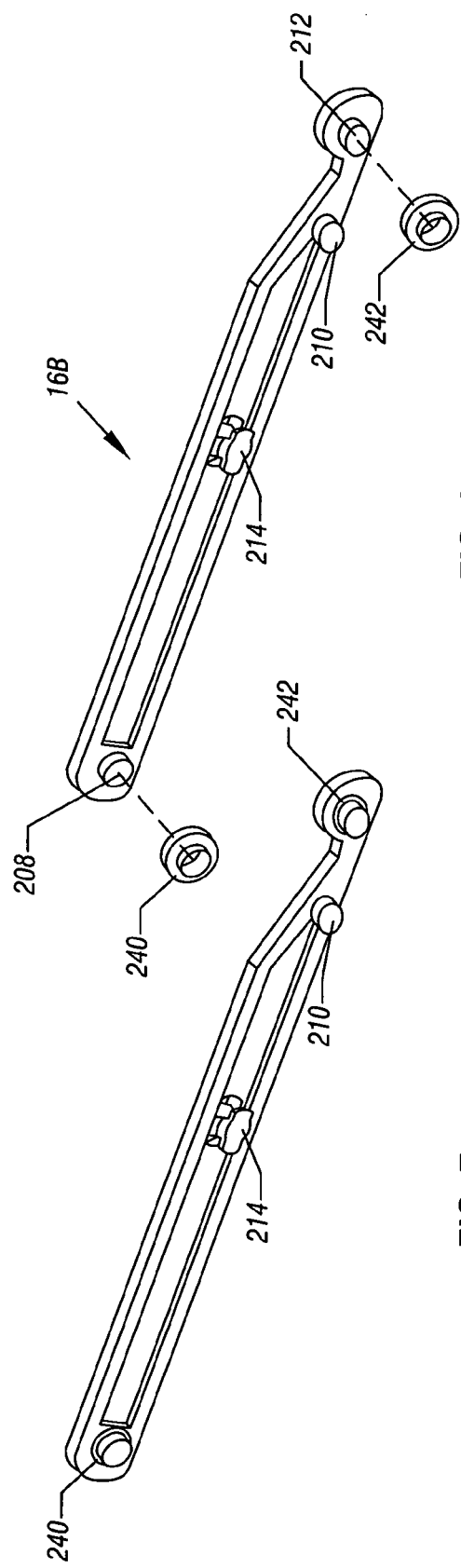

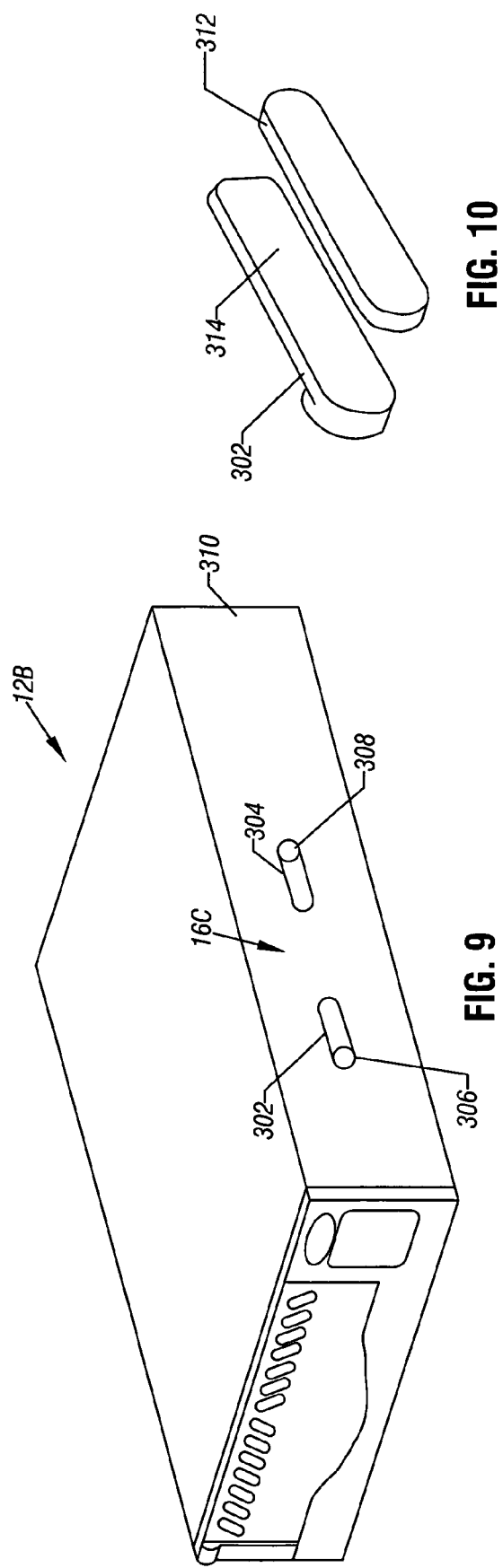

MOUNTING A COMPUTER PERIPHERAL DEVICE USING A MOUNTING RAIL

CROSS-REFERENCE TO RELATED APPLICATIONS

This is a divisional of U.S. Ser. No. 10/608,727, filed Jun. 27, 2003, now U.S. Pat. No. 6,914,778 which is hereby incorporated by reference.

BACKGROUND

A computer includes various components, such as a central processing unit (CPU), main memory, peripheral devices, and others. In some computers, especially in servers, multiple bays are provided to receive various types of peripheral devices, such as floppy disk drives, hard disk drives, tape drives, optical drives, and so forth. The bays enable convenient removal and/or addition of the peripheral devices to a computer. For example, if increased storage capacity is desired, additional storage devices can be added to empty bays of a computer, or existing storage devices can be removed and replaced with new storage devices of larger capacity. The multiple bays of a computer also allow for different types of storage devices to be mounted in the computer.

Conventionally, peripheral devices are removably mounted in the bays of the computer with mounting mechanisms attached to the peripheral devices. In some implementations, the mounting mechanisms include rails that enable sliding engagement of the peripheral devices in respective computer bays.

A feature of conventional mounting rails is that the mounting rails are attached to the peripheral device by screws or other like fasteners. One issue associated with the use of screws or other like fasteners is that a tool, such as a screwdriver, has to be used to attach the mounting rails to the peripheral device. This method of attachment is generally inconvenient to a user. A further issue is that there may not be sufficient space inside a peripheral device to accept the threaded protrusion of a screw. Also, screw heads take up space, and there may not be sufficient space between the computer bay and the peripheral device for the screw head

BRIEF DESCRIPTION OF THE DRAWINGS

FIGS. 7 and 8 further illustrate the mounting rail of FIG. 6.

FIG. 9 is a perspective view of a peripheral device with a mounting rail according to yet another embodiment.

FIG. 10 further illustrates the mounting rail of FIG. 9.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
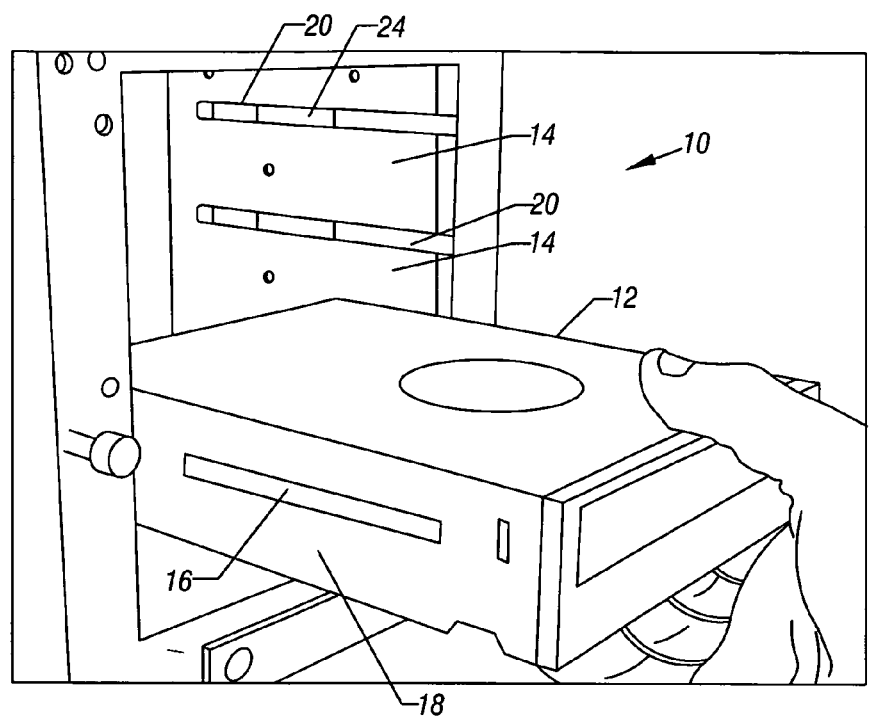
FIG. 1 is a perspective view of a portion of a computer server that has multiple bays for receiving peripheral devices.

FIG. 1 shows an example computer server 10 having multiple bays 14 for receiving respective computer peripheral devices 12 (one peripheral device 12 is shown in FIG. 1). In the example of FIG. 1, the peripheral device 12 is a compact disc (CD) drive (e.g., a 5.25" form factor CD drive). However, in alternative embodiments, other types of peripheral devices, such as DVD drives, floppy disk drives, hard disk drives, tape drives, peripheral cards or boards, and so forth, can be mounted into the bays 14. The bays 14 may be 5.25" form factor bays or others. The peripheral device 12 has at least one side surface 18 on which is mounted a mounting rail 16. In some embodiments, two mounting rails 16 are attached to respective two side surfaces of the peripheral device 12 (such as a left side surface and a right side surface).

A characteristic of the mounting rail 16 is that it can be easily attached to the peripheral device 12 to enhance user convenience. In some embodiments, the mounting rail 16 includes one or more engagement profiles. The peripheral device 12 has corresponding engagement profiles that enable the attachment of the mounting rail 16 to the peripheral device 12. An engagement profile of the mounting rail 16 includes a protruding element (e.g., a key), while an engagement profile of the peripheral device 12 includes a receptacle (e.g., a key receptacle) on a side surface of the peripheral device to receive the protruding element. Alternatively, the protruding element can be provided on the side surface of the peripheral device while the receptacle is provided on the mounting rail. Other engagement profiles also include alignment elements to properly align the mounting rail to the peripheral device. As examples, the alignment elements include alignment posts and alignment holes to receive the alignment posts.

In alternative implementations, an adhesive is used to attach the mounting rail to the peripheral device. The mounting rail can be a single-segment element, or it can be made up of plural, separate segments. The mounting rail can be attached to the peripheral device in other ways as well.

FIG. 1 also shows right slots 20 in the bays 14 for slidably receiving mounting rails 16 attached to the right side surfaces of respective peripheral devices 12. Slots 22 (FIG. 2) are also provided on the left sides of the bays 14 to receive mounting rails mounted on the left side surfaces of respective peripheral devices 12.

Note that the right and left slots 20 and 22 in each bay 14 are different. The left slot 22 has a latching mechanism 23 to engage a profile on the mounting rail 16, while the right slot 20 does not have such a latching mechanism. Instead, in the example implementation shown in FIG. 1, the right slot 20 has a spring tab 24 for biasing the peripheral device 12 to the left side of the bay 14 to enhance engagement of the mounting rail 16 in the left slot 22. The latching mechanism 23 in cooperation with the profile of the mounting rail 16 provide a snap-locking mechanism that enables the peripheral device 12 to be removably mounted in the bay 14. Tactile feedback may be provided to the user when the latching mechanism is engaged upon mounting of the peripheral device in the bay.

Figure 3:
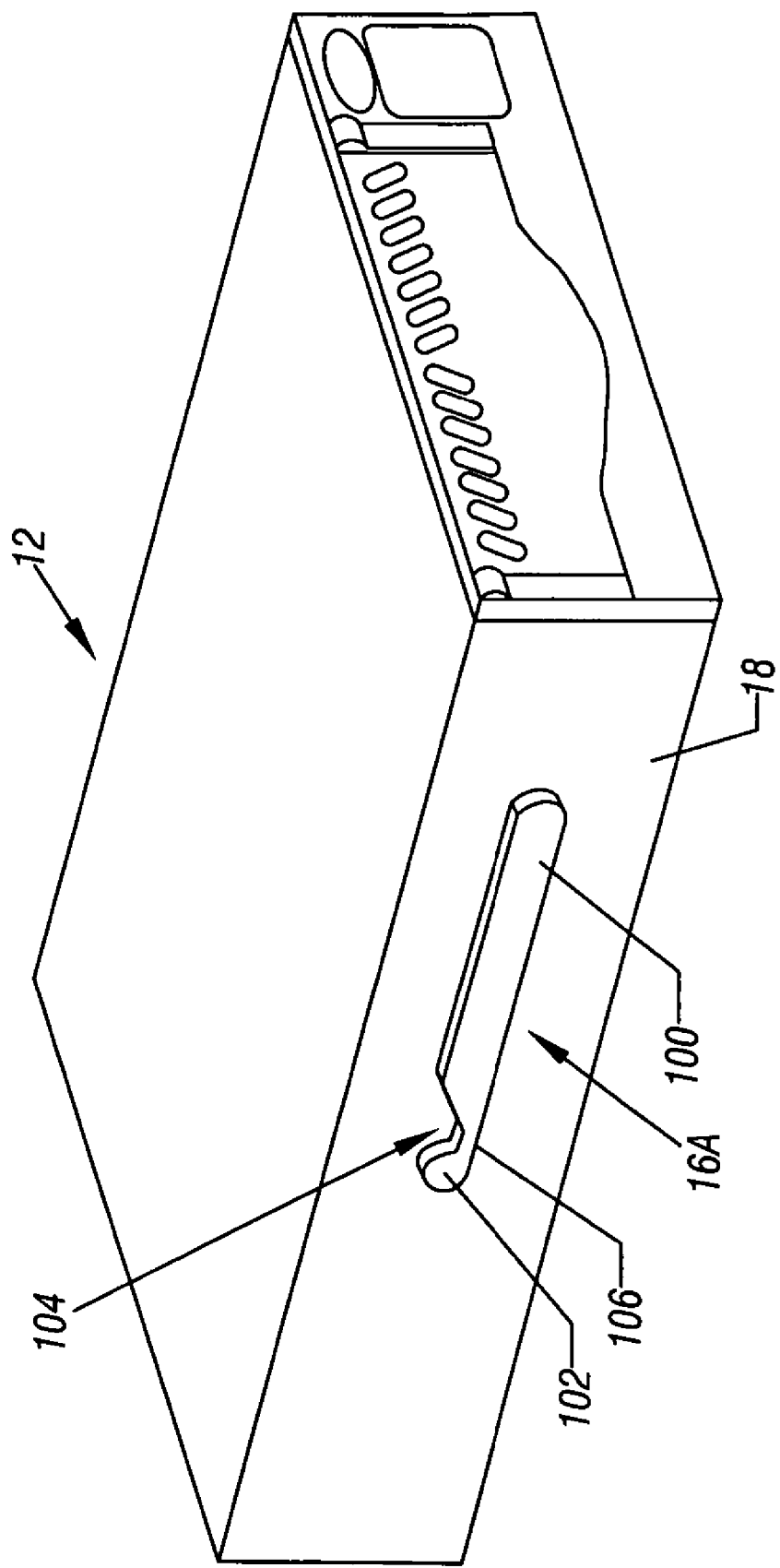
FIG. 3 is a perspective view of a peripheral device with a mounting rail according to one embodiment attached to a side of the peripheral device.

FIG. 3 shows one embodiment of a mounting rail 16A that can be lockingly engaged by the latching mechanism 24 in the left bay slot 22. The mounting rail 16A has a main, elongated segment 100. A locking member 102 is provided at one end of the mounting rail 16A, with the locking member 102 having a generally round shape in the illustrated example. Adjacent the locking member 102 is a neck segment 106 that connects the locking member 102 to the main segment 100. FIG. 3 shows the locking member 102, neck segment 106, and main segment 100 as being integrally formed. However, in alternative embodiments, these can be separate pieces attached together.

Figure 2:
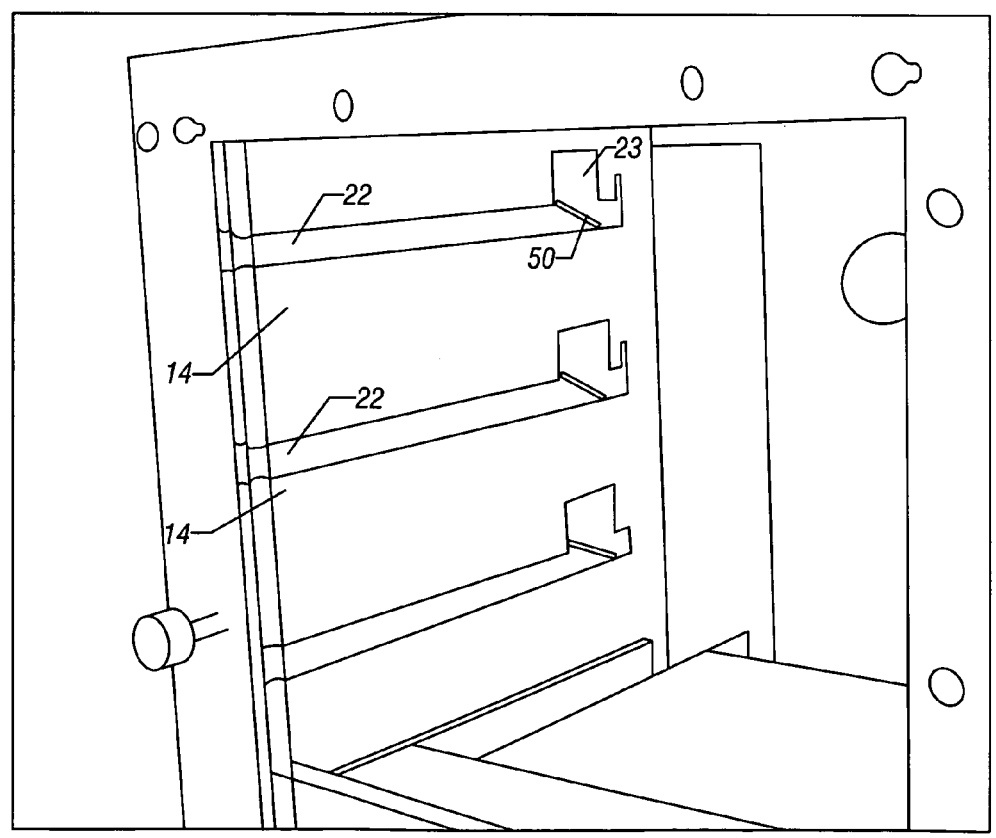
FIG. 2 is a different perspective view of the bays of the server of FIG. 1.

The combination of the locking member 102, neck segment 106, and the main segment 100 defines a locking recess 104, that is configured to receive a locking flipper 50 of the latching mechanism 24 (FIG. 2). The locking flipper 50 is biased by a spring or other like device to its lower position shown in FIG. 2. However, as the locking member 102 of the mounting rail 16A (FIG. 3) is pushed inwardly into the left slot 22, the locking flipper 50 is pushed upwardly by the generally round locking member 102. Once the locking member 102 passes the locking flipper 50, the locking flipper 50 is biased into the locking recess 104 of the mounting rail 16A, which provides locking engagement of the locking flipper 50 against the mounting rail 16A. Note that in other embodiments, other types of locking mechanisms 24 in the mounting bays 14 can be employed.

Figure 4:
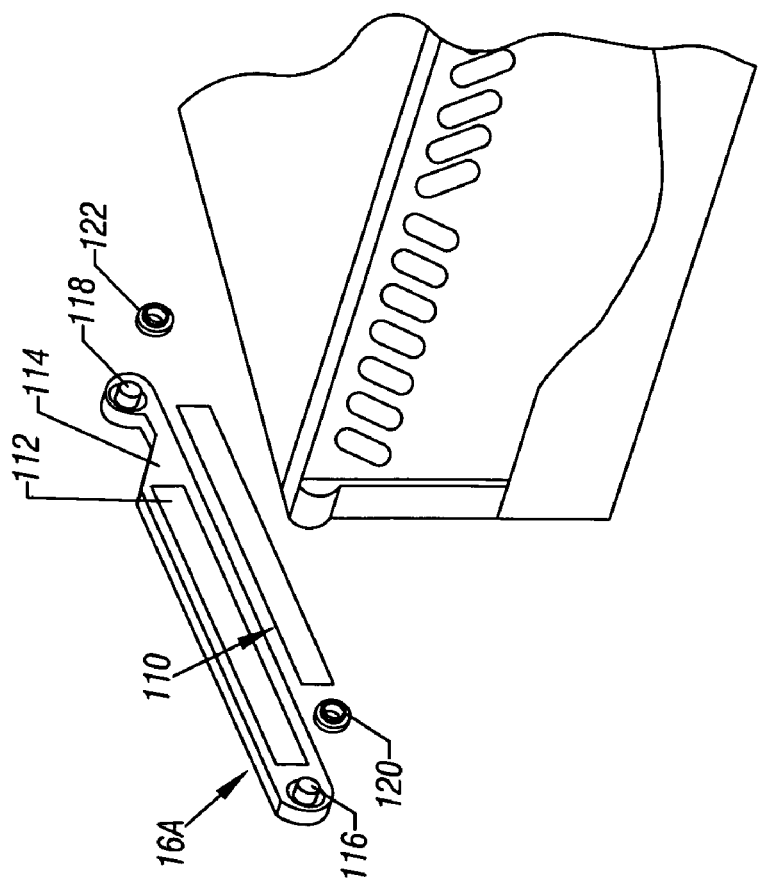

As shown in FIG. 4, the mounting rail 16A is attached to the side surface 18 of the peripheral device 12 by an adhesive film 110. The adhesive film 110, which in the example shown in FIG. 4 is generally rectangular in shape, is attached on one side to a recess 112. The recess 112 is formed in the side (referred to as the attachment side 114) of the mounting rail 16A facing the side surface 18 of the peripheral device 12. Alignment members 116 and 118 are formed on respective ends of the mounting rail 16A. In the example implementation, the alignment members 116 and 118 are generally cylindrical in shape to provide alignment posts. However, the alignment members can have other structures or shapes in other embodiments.

Figure 5:
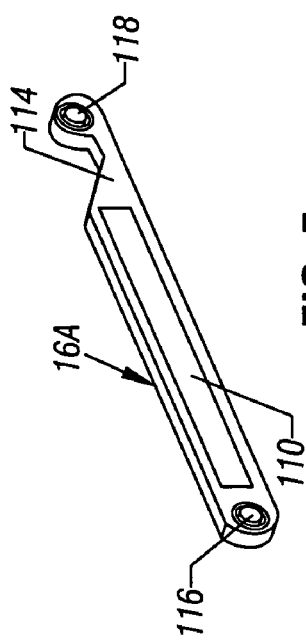
FIGS. 4 and 5 further illustrate the mounting rail of FIG. 3.

Also, generally ring-shaped grommets 120 and 122 are mounted onto the alignment members 116 and 118, respectively. In one embodiment, the grommets 120 and 122 are formed of a resilient material, such as rubber or polymer, to provide shock absorption between the mounting rail 16A and the peripheral device 12 housing. In an alternate embodiment of the mounting rail 16A, the grommets 120 and 122 can be omitted from the mounting rail 16A. FIG. 5 shows the mounting rail 16A with the adhesive film 110 and the grommets 120 and 122 attached to the mounting rail 16A.

Figure 6:
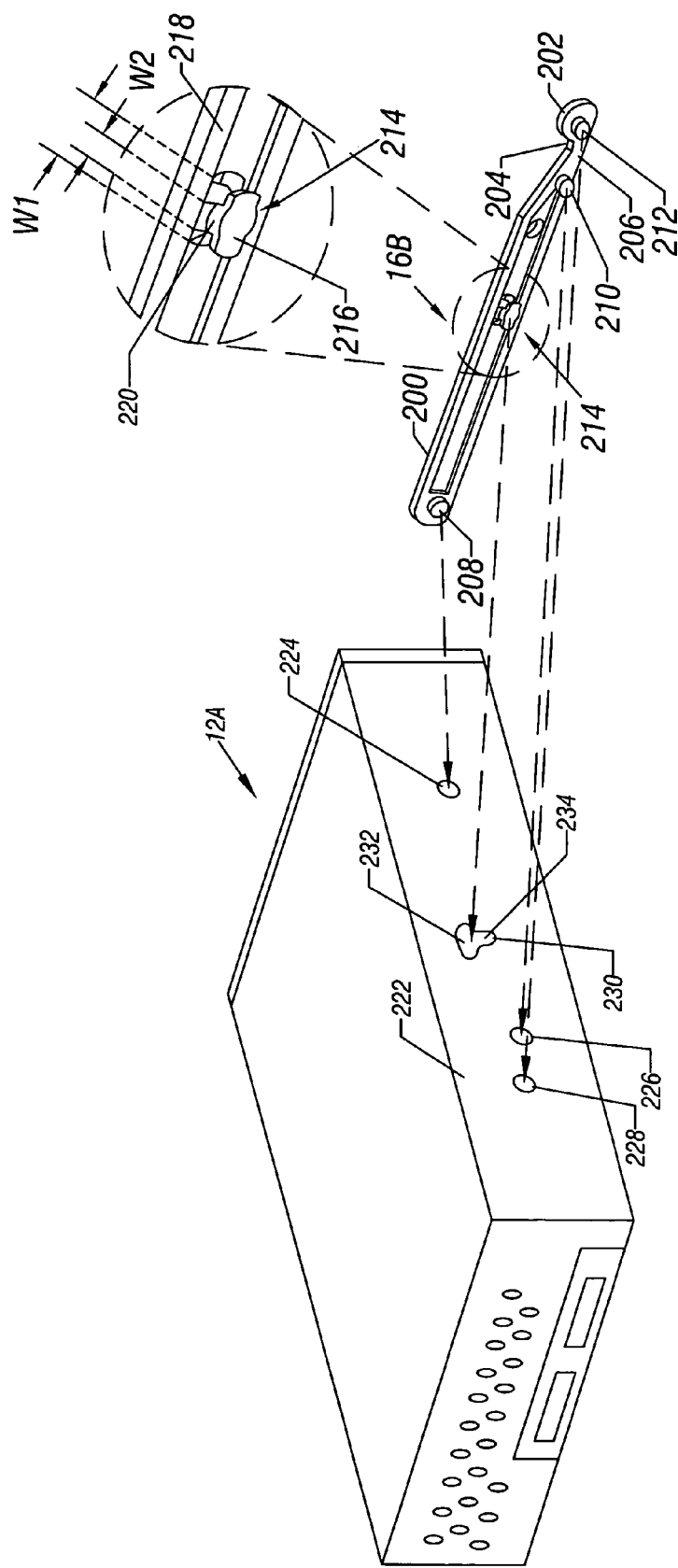
FIG. 6 illustrates a peripheral device having a key profile and alignment elements for engagement to a mounting rail according to another embodiment.

FIG. 6 shows a mounting rail 16B according to another embodiment. The mounting rail 16B also has a generally elongated main segment 200, along with a generally round locking member 202. A locking recess 204 is defined by the combination of the main segment 200, the locking member 202, and a neck segment 206.

The mounting rail 16B has three alignment posts 208, 210, and 212. The alignment posts 208 and 212 are provided at the ends of the mounting rail 16B on its attachment side, while the alignment post 210 is provided intermediate the alignment posts 208 and 212.

Additionally, the mounting rail 16B has a key 214, which has an elongated plate 216 that is raised above the main surface 218 of the attachment side of the mounting rail 16B. The plate 216 is raised by a support member 220. Note that the width W1 of the elongated plate 216 is larger than the width W2 of the support member 220.

As further shown in FIG. 6, the alignment posts 208, 210, and 212, and the key 214 are adapted to engage respective openings and receptacles on a side surface 222 of a peripheral device 12A. The alignment posts 208, 210, and 212 are inserted into alignment openings 224, 226, and 228, respectively. Furthermore, the key 214 on the mounting rail 16B is engaged into a key receptacle 230 on the side surface 222 of the peripheral device. The key receptacle 230 has an enlarged portion 232 and a reduced portion 234. The enlarged portion 232 has a width that is slightly larger than the width W1 of the key plate 216 of the key 214 so that the key plate 216 can be inserted into the enlarged portion 232. Once the key plate 216 is inserted into the enlarged portion 232 of the key receptacle 230, the mounting rail 16B is pushed downwardly by the user such that the key plate 216 drops below the enlarged portion 232 of the key receptacle 230. The reduced portion 234 of the key receptacle 230 is able to receive the support member 220 of the key 214. Once pushed downwardly, the key 214 is lockingly engaged in the key receptacle 230. In an alternative implementation, the key of the mounting rail 16B can be rotatably mounted in a key receptacle to a locking position, rather than by sliding mounting as discussed above.

The mounting rail 16B on each side of the peripheral device 12A is configured to be removable from the peripheral device (such as with a snap-fit arrangement). Alternatively, the mounting rail 16B, once mounted, is permanently attached. Examples of various connection types include a press-fit connection, function-retained connection, snapping connection, bayonet type connection, or other removable or permanent types of connections and locking arrangements.

The elongated main segment 200 of mounting rail 16B may be curved or bowed such that the ends of the mounting rail 16B adjacent to the alignment posts 208 and 212 contact the side surface 222 of the peripheral device 12A before the key 214 begins to engage in the key receptacle 230. Thus the mounting rail 16B bends substantially to lockingly engage the key 214 into the key receptacle 230. This bending force will ensure that the rail 16B remains snuggly attached to the side surface 222 of peripheral device 12A. Note that a similar arrangement can be provided on the other side of the peripheral device 12A.

The mounting rail 16 is fabricated from a durable, resilient material, such as polymer (e.g., a glass-filled polymer), metal (e.g., sheet metal mild steel), or other materials. The polymer may be wear-resistant with a low coefficient of friction so that the peripheral device can be easily and repeatedly engaged or mounted into a bay.

FIGS. 7 and 8 illustrate generally ring-shaped shock-absorbing grommets 240 and 242 mounted onto respective alignment posts 208 and 212 of the mounting rail 16B. The shock-absorbing grommets are designed to provide shock absorption between the mounting rail 16B and the housing of the peripheral device 12A. These shock-absorbing grommets 240 and 242 are optional improvements to the mounting rail 16B, and may be omitted.

The middle alignment post 210 is located between alignment posts 208 and 212 and generally closer to either alignment post 208 or 212. The middle alignment post 210 is intended to function as an orientation feature that would prevent the mounting rail 16B from being attached upside down such that the alignment post 208 is mistakenly inserted into alignment opening 228 rather than the correct alignment opening 224, and alignment post 212 is mistakenly inserted into alignment opening 224 rather than the correct alignment opening 228. If rail orientation is not a concern in a specific application, then the middle alignment post 210 can be omitted from the mounting rail 16B.

An alternate embodiment of a rail orientation mechanism includes the key 214 being located substantially away from the midpoint of alignment posts 208 and 212. In this alternate embodiment, the key 214 provides the orientation function.

FIGS. 9 and 10 illustrate yet another embodiment of a mounting rail 16C. The mounting rail 16C is made up of two separate segments 302 and 304. The segment 302 has an alignment post 306, and the segment 304 also has an alignment post 308. Each of the segments 302 and 304 is attached to the side surface 310 of a peripheral device 12B. As shown in FIG. 10, an adhesive, for example, may be used to attach the segments to the peripheral device. The adhesive attachment is accomplished by use of an adhesive film 312 having a first side to attach to a side 314 of the mounting rail segment 302, and a second side to attach to the side surface 310 of the peripheral device 12B housing.

Figure 11:
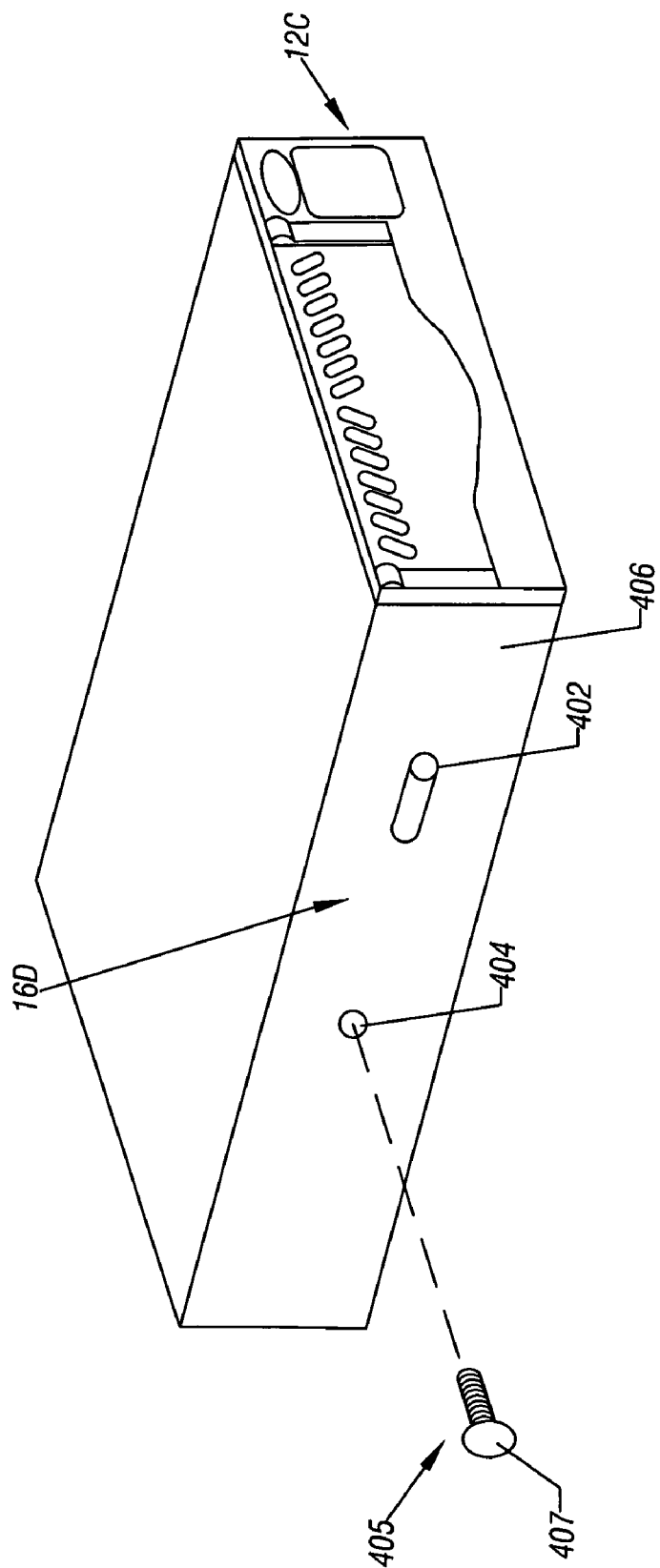
FIG. 11 is a perspective view of a peripheral device with a mounting rail according to further embodiment of the invention.

In yet another embodiment, as shown in FIG. 11, a mounting rail 16D includes multiple segments, with a first segment 402 that is the same as the mounting rail segment 302 or 304 shown in FIGS. 9 and 10. A second segment 405 is a screw for fastening to a threaded hole 404 in the side surface 406 of a peripheral device 12C. In one implementation, the head 407 of the screw 405 enables sliding engagement in a slot of a mounting bay 14. Alternatively, a screw-attached mounting rail similar to mounting rail 402 can be used, except that a screw is used instead of an adhesive for purposes of attachment.

The various mounting rails described above are easily attachable to the peripheral device. Also, with some mounting rails, extra space does not have to be reserved for screws or other like fasteners. Also, with such mounting rails, various users do not have to employ tools to attach the mounting rails to peripheral devices, which enhances user convenience.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A mounting apparatus for enabling the mounting of a computer peripheral device to a peripheral device bay of a computer system, comprising:
    a mounting rail adapted to slideably engage a profile in the peripheral device bay; and
    an adhesive element adapted to attach the mounting rail to a side surface of the computer peripheral device,
    wherein the mounting rail has a recess to receive a latch member of the peripheral device bay.

2. The mounting apparatus of claim 1, wherein the mounting rail has alignment elements to align the mounting rail with respect to the side surface of the computer peripheral device.

3. The mounting apparatus of claim 1, wherein the mounting rail is formed of a polymer.

4. A mounting apparatus for enabling the mounting of a computer peripheral device to a peripheral device bay of a computer system, comprising:
    a mounting rail adapted to slideably engage a profile in the peripheral device bay; and
    an adhesive element adapted to attach the mounting rail to a side surface of the computer peripheral device,
    wherein the mounting rail has an alignment post to align the mounting rail with respect to the side surface of the computer peripheral device; and
    a generally ring-shaped shock absorbing member separate from the alignment post but mounted on the alignment post between the mounting rail and the computer peripheral device.

5. A mounting apparatus for enabling the mounting of a computer peripheral device to a peripheral device bay of a computer system, comprising:
    a mounting rail adapted to slideably engage a profile in the peripheral device bay; and
    an adhesive element adapted to attach the mounting rail to a side surface of the computer peripheral device,
    wherein an assembly of the computer peripheral device and the mounting rail is adapted to be removably mounted in the peripheral device bay with a snap-locking mechanism.

6. The mounting apparatus of claim 5, further comprising a second mounting rail and a second adhesive element to attach the second mounting rail to the side surface of the computer peripheral device.

7. The mounting apparatus of claim 6, further comprising a third mounting rail and a third adhesive element to attach the third mounting rail to another side surface of the computer peripheral device.

8. The mounting apparatus of claim 7, further comprising a fourth mounting rail and a fourth adhesive element to attach the fourth mounting rail to the another side surface of the computer peripheral device.

9. The mounting apparatus of claim 5, further comprising a screw for fastening to the side surface of the computer peripheral device, the screw having a head to enable sliding engagement in the profile of the peripheral device bay.

10. The mounting apparatus of claim 5, further comprising a second mounting rail fastened by a screw to the side surface of the computer peripheral device, the second mounting rail adapted to slideably engage the profile in the peripheral device bay.

11. A system, comprising:
    a computer peripheral device;
    a bay receiving the computer peripheral device;
    a mounting rail; and
    an adhesive element adapted to attach the mounting rail to a side surface of the computer peripheral device, the mounting rail slideably engaged in the bay,
    wherein the bay has a latch member, and wherein the mounting rail has a recess to receive the latch member of the bay.

12. The system of claim 11, further comprising a shock absorbing member provided between the mounting rail and the computer peripheral device.

13. A method of mounting a computer peripheral device in a peripheral device bay of a computer system, comprising:
    providing the computer peripheral device having a side surface;
    attaching, with an adhesive, a mounting rail to the side surface of the computer peripheral device;
    slideably engaging the mounting rail in a profile of a peripheral device bay,
    providing a recess in the mounting rail; and
    engaging the recess with a latch member of the peripheral device bay upon mounting the computer peripheral device in the peripheral device bay.

* * * * *